(12) United States Patent  
Wang et al.

(10) Patent No.: US 6,173,406 B1
(45) Date of Patent: Jan. 9, 2001

(54) AUTHENTICATION SYSTEMS, METHODS, AND COMPUTER PROGRAM PRODUCTS

(75) Inventors: Edward Yan-Bing Wang, Oakland; Dawson F. Dean, Piedmont; Ling Tony Chen, Cupertino; Anders Edgar Klemets; Navin Chaddha, both of Sunnyvale, all of CA (US)

(73) Assignee: Microsoft Corporation, Redmond, WA (US)

( * ) Notice: Under 35 U.S.C. 154(b), the term of this patent shall be extended for 0 days.

(21) Appl. No.: 08/895,256

(22) Filed: Jul. 15, 1997

(51) Int. Cl.[7] .................... G06F 11/30; G06F 15/173; G06F 15/16
(52) U.S. Cl. ...................... 713/201; 709/223; 709/231
(58) Field of Search .................... 395/187.01, 182.01, 395/200.47, 200.33, 200.5, 200.51, 200.53, 200.54, 200.55, 200.56, 200.61; 713/200, 201; 710/200; 709/203, 217, 220, 221, 223–226, 231

(56) References Cited

U.S. PATENT DOCUMENTS

| 5,276,845 | | 1/1994 | Takayama | 395/425 |
|---|---|---|---|---|
| 5,671,226 | * | 9/1997 | Murakami et al. | 370/474 |
| 5,737,419 | | 4/1998 | Ganesan | 380/21 |
| 5,737,619 | * | 4/1998 | Judson | 395/761 |
| 5,740,231 | | 4/1998 | Cohn et al. | 379/89 |
| 5,745,782 | * | 4/1998 | Conway | 395/806 |
| 5,748,890 | * | 5/1998 | Goldberg et al. | 713/202 |
| 5,784,609 | * | 7/1998 | Kurihara | 395/609 |
| 5,793,966 | * | 8/1998 | Amstein et al. | 395/200.33 |
| 5,809,261 | | 9/1998 | Lambrecht | 395/308 |
| 5,812,776 | * | 9/1998 | Gifford | 395/200.47 |
| 5,813,007 | * | 9/1998 | Nielsen | 707/10 |
| 5,835,726 | | 11/1998 | Shwed et al. | 395/200.59 |
| 5,841,970 | | 11/1998 | Tabuki | 395/187.01 |
| 5,870,546 | * | 2/1999 | Kirsch | 395/200.33 |
| 5,944,824 | | 8/1999 | He | 713/201 |
| 6,006,333 | | 12/1999 | Nielsen | 713/202 |

* cited by examiner

Primary Examiner—Robert W. Beausoliel, Jr.
Assistant Examiner—Rita Ziemer
(74) Attorney, Agent, or Firm—Schwegman, Lundberg, Woessner & Kluth, P.A.

(57) ABSTRACT

Authentication methods, systems and computer program products ensure that user media streaming requests originate with web documents having an authorized URL. The user makes a streaming request to a media server with a URL including a URL prefix, a path, and the name of a media work to be performed, which URL the media server compares with earlier made URL entries in a pre-established database. If there is a URL correspondence between a URL in the pre-established database and the URL extracted from the HTML document received by the browser from a web server, then streaming of the particular work is authorized.

16 Claims, 9 Drawing Sheets

AUTHENTICATION SYSTEMS, METHODS, AND COMPUTER PROGRAM PRODUCTS

CROSS-REFERENCE TO RELATED APPLICATION

This application is related to an application having the title "AUTHORIZATION SYSTEMS, METHODS, AND COMPUTER PROGRAM PRODUCTS," and to same inventors, filed on common date herewith under U.S. patent Ser. No. 08/893,293 the totality of which is hereby expressly incorporated herein and made a part hereof by reference.

TECHNICAL FIELD

The present invention relates to the transportation of data from a content node to a presentation node on a network, and particularly to the presentation of audio and video information on a selected network node which is presented at a user node with assistance from a media content server.

BACKGROUND OF THE INVENTION

Video or audio content presented to a user on a web browser may be in content documents and pages received from a media server, e.g., a video or audio server. The web browser may contain, or receive by downloading, a plug-in which is configured to play real-time audio or real-time video (respectively "streaming or real-time audio or video") in cooperation with streaming data from an external video or audio server. The video or audio plug-in is installed on a client machine and includes code which opens a predetermined window in the browser within which the video content is played and viewable.

Unfortunately, the content provider often has no control over the amount of content usage by a user nor over the replication of this content. Accordingly, there is a need to control content presentation and reproduction by unauthorized and unauthenticated users of media content distributed over networks, including but not limited to the Internet.

In particular, there is a desire to ensure that content is sourced from the original content producer or maker at an initial URL, rather than allowing secondary sourcing from intermediate distributors who may undesirably modify the original content, or undesirably strip off ancillary content such as advertising material for example, or who may not charge the user. Thus, it would be desirable to encourage the user to view or receive only originally constituted content.

SUMMARY OF THE INVENTION

According to the present invention, the uniform resource locator (URL) code associated with a page provided by a world wide web server to a user is stored and provided to a media server which maintains a data base of documents and corresponding authorized URL profiles. When a user requests real-time presentation of selected media content, the user communicates the document name and URL prefix to the media server cooperating in user presentation of the selected content for authentication. If it is determined that there is no authorized correspondence with the indicated URL prefix and the document name provided, then the user node is notified that the requested presentation is unauthorized.

According to one embodiment of the present invention, the user is provided with the correct URL prefix to permit the user to communicate with the authorized content source directly, for example, to enable the user to download the document of interest from the authorized URL content provider for authorized viewing in cooperation with the selected media video server.

DETAILED DESCRIPTION OF A PREFERRED EMBODIMENT

Figure 1A:
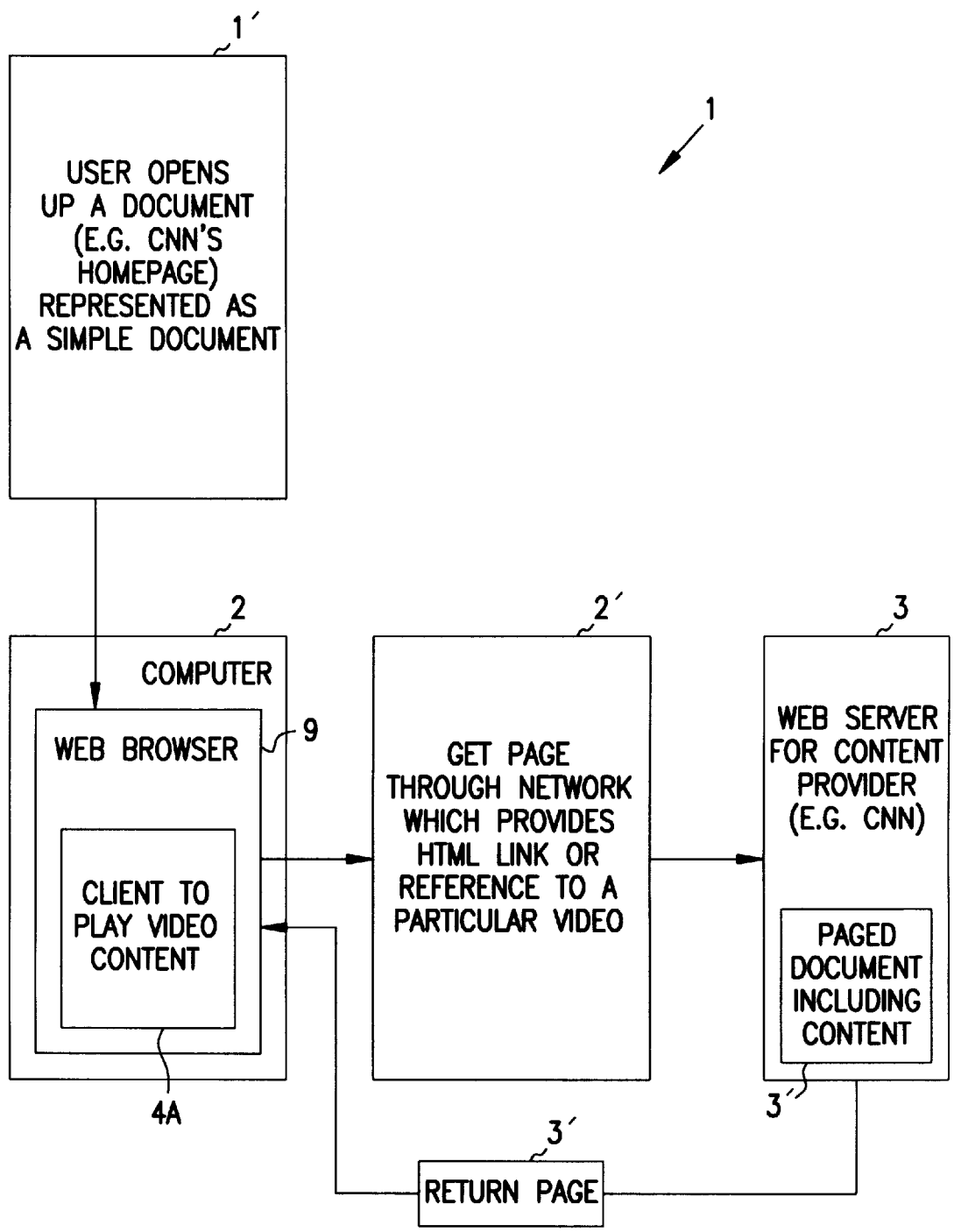
FIG. 1A is a block diagram of a computer network including a computer having installed therein a web server for a content provider.

FIG. 1A is a block diagram of a computer network 1 including a computer 2 and a web server 3. The web server 3 is used by a particular content provider, such as CNN for example, to broadcast selected content including but not limited to documents having video content to a wide range of clients and users. Computer 2 has a web browser 9 installed in the network 1. The web browser 4 is configured to include a plug-in 4A connected to the web server 3. The plug-in 4A is effective for playing or performing real-time video or audio content in association with an external video or audio server. The web browser 9 is a conventional browser provided by Netscape or Microsoft Explorer, for example. Plug-in 4A enables the user to open up a document received or downloaded from web server 3. The document received may be for example CNN's home page, and it may include predetermined elements or parts which have been linked together, such as pictures or video windows, for example. In operation, the user requests certain content of interest, such as a particular page or document, and in response to the request, the web server provides the document specified by the uniform resource locator (URL) for the document. Uniform resource locator (URL) is defined below in connection with FIG. 9 as including in part a reference to a server, a path, and a file name. According to one embodiment of the present invention, the client 4A is configured to find the URL associated with the particular document, as will be discussed in detail below.

Figure 1B:
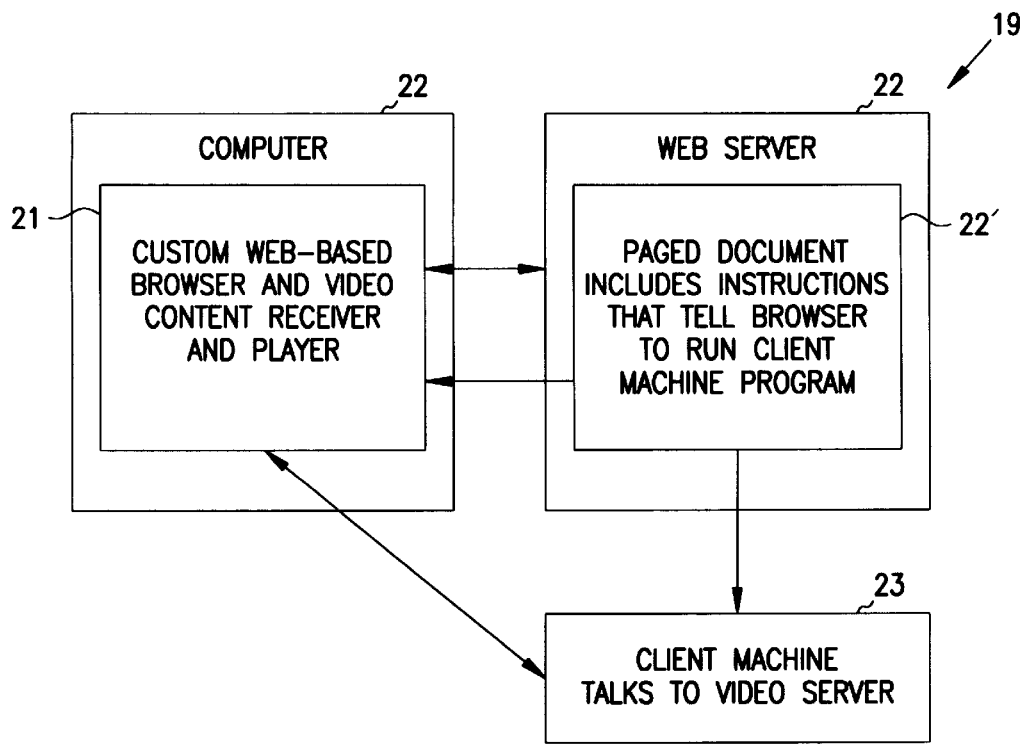
FIG. 1B is a block diagram of a computer network including a computer having installed therein a browser.

FIG. 1B is a block diagram of a computer network 19 including a computer 20 which has installed therein a browser 21. The computer network 19 further includes a web server 22 in networked communication (through a LAN, a WAN, the Internet, or another wired or wireless communication system) with computer 20 and browser 21. Web server 20 includes a source of distributable content which may include documents including video or audio content. Computer network 19 further includes a video media server 23 for example, which receives content from web server 22 and play requests from browser 21.

Figure 1C:
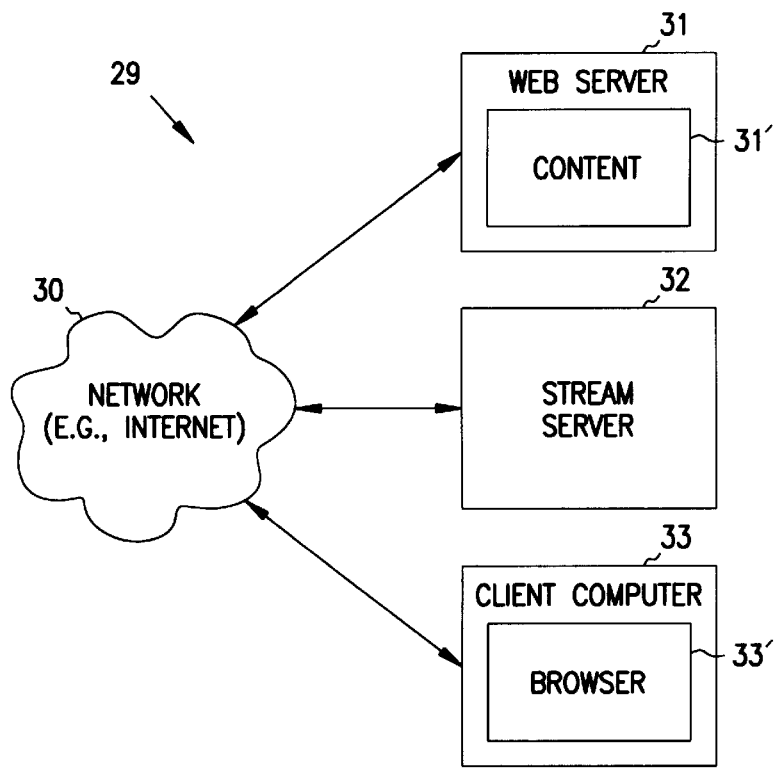
FIG. 1C is a block diagram of a computer according to the present invention.

FIG. 1C is a block diagram of a computer system 29 according to the present invention. In particular, the computer system 29 includes a network 30 such as the Internet, a web server 31 including content 31', a stream server 32 for enabling the playing of selected content originating from web server 31 and stream server 32, and a client computer 33 having a browser 33' for receiving selected content from web server 31 and controlling the substantially real-time presentation of selected content in communication with stream server 32.

Figure 1D:
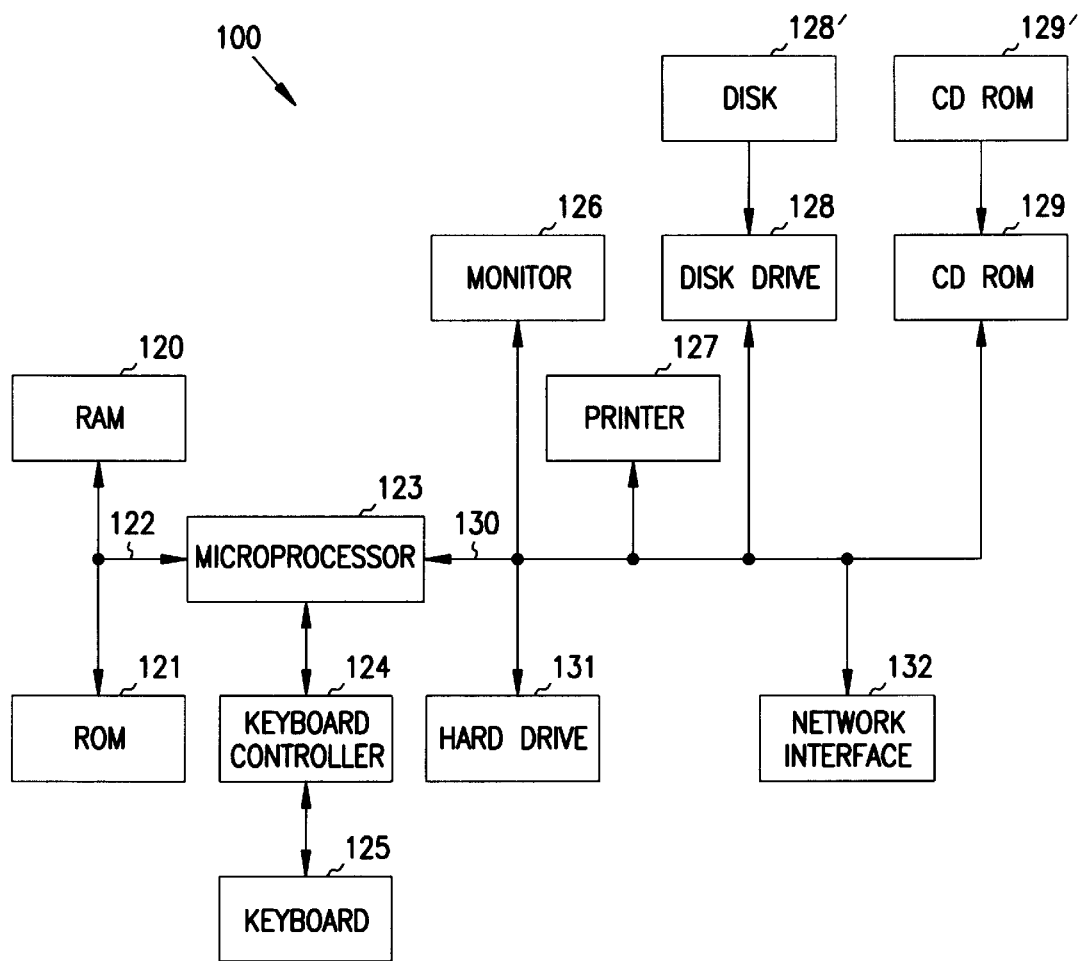
FIG. 1D is a block diagram of a computer system which can be used as a client computer for playing selected audio and video content in accordance with the present invention.

FIG. 1D is a block diagram of a computer system 100 which can be used as a client computer for playing selected audio and video content in accordance with the present invention. Computer system 100 includes random access memory (RAM) 120; read only memory (ROM) 121; a memory bus 122 connected to RAM 120 and ROM 121; a microprocessor 123 connected to the memory bus 122; a monitor 126; a printer 127; a disk drive 128; a compact disk read only memory (CD ROM) drive 129; a peripheral bus 130 connected to monitor 126, printer 127, disk drive 128, and CD ROM drive 129; a hard drive 131; and a network interface, each connected to peripheral bus 130 as shown in FIG. 1D. Disk drive 128 and CD ROM drive 129 are respectively able to read information including computer program products (not shown) which can be embedded on media such as, respectively, a magnetic or optical disk or floppy 128' and a CD ROM medium 129'. Depending upon the selected drive and medium, writing on the selected medium as well as reading can be accomplished.

Figure 1E:
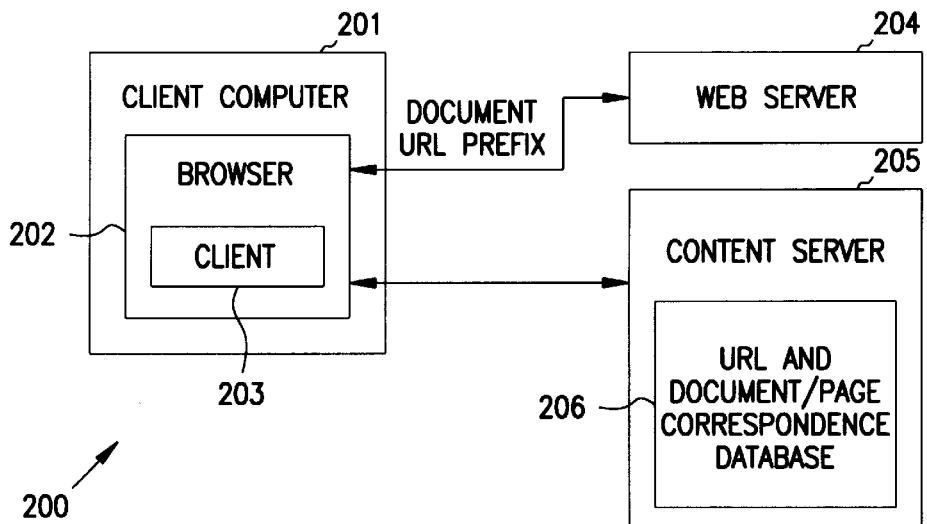
FIG. 1E is a block diagram of a system according to the present invention, which includes a client computer for user selected renderable content performances, which includes a browser and a client.

FIG. 1E is a block diagram of a system 200 according to the present invention, which includes a client computer 201 for user selected renderable content performances, which includes a web browser 202 and a plug-in 203 plugged into web browser 202. System 200 further includes a web server 204 and a content (e.g., a video or an audio) server 205 having a data base including related URL and content components to specify which URLs are authorized for which content performances. To obtain the URL of a web page received from a web server, a plug-in 203 operates for example with a Netscape Navigator web browser. The plug-in runs inside Navigator and displays its output inside the Navigator browser window. The plug-in 203 is started by the browser when it displays a web page that contains a command to invoke the plug-in 203. The plug-in 203 then runs until the web browser 202 displays a different web page. According to one embodiment, the web browser 202 downloads a file from the web server 204 and feeds it as input to the plug-in 203. There is a mechanism whereby the plug-in 203 can ask the web browser 202 to download a selected file on its behalf. Alternatively, a plug-in 203 can contact a video server directly, without enlisting the help of the web browser. To determine the URL of the web page that launched the plug-in, the following steps are undertaken. A typical URL is in the form "http://server/path/file#anchor". The "#anchor" part is optional and tells the browser that it should search for a "tag" or "mark" called "anchor" in the document given by the URL "http://server/path/file". As is well-known, many web pages are written in a command language called HTML, which has support for anchor tags. The web browser 202 displays the document with the text that immediately follows the anchor tag at the top of the screen. A web document may refer to other documents or even to itself, using a shorthand form called a relative URL. It is sometimes useful to refer different parts within the current document. Such references are for example "#anchor1: or "anchor2", etc. This is a relative URL, with the file name part of the URL being omitted. Omitting the file name makes it possible to rename the HTML file without having to update the URLs that refer to the file. According to one embodiment of the present invention in which the client machine is launched by Netscape Navigator version 3.0, the client asks the web browser 202 to deliver the URL "#". Since the left hand side of "#" is empty, it means "the current document, whatever its name might be ". Leaving the right hand side of "#" empty means "no particular anchor ". In addition, the client asks the web browser 202 to deliver the file only when it has been fully downloaded. When the file has been fully downloaded, the web browser 202 invokes a function in the plug-in client 203 which is part of the Netscape plug-in API. One of the parameters to this function is a data structure that contains the complete URL of the current document. If the plug-in client 203 detects that the browser is Netscape Navigator 4.0, it asks the web browser 202 to deliver the following URL: "javascript:document.URL ". The "javascript: " part tells the web browser 202 that what follows on the right hand side of the colon is a command in the JavaScript language. The web browser 202 has a built in JavaScript interpreter. The "document.URL " command returns a text file with the URL of the current document. This text file is delivered to the plug-in client 203. The plug-in client 203 then just reads the file and extracts the URL of the current document from it.

Figure 1F:
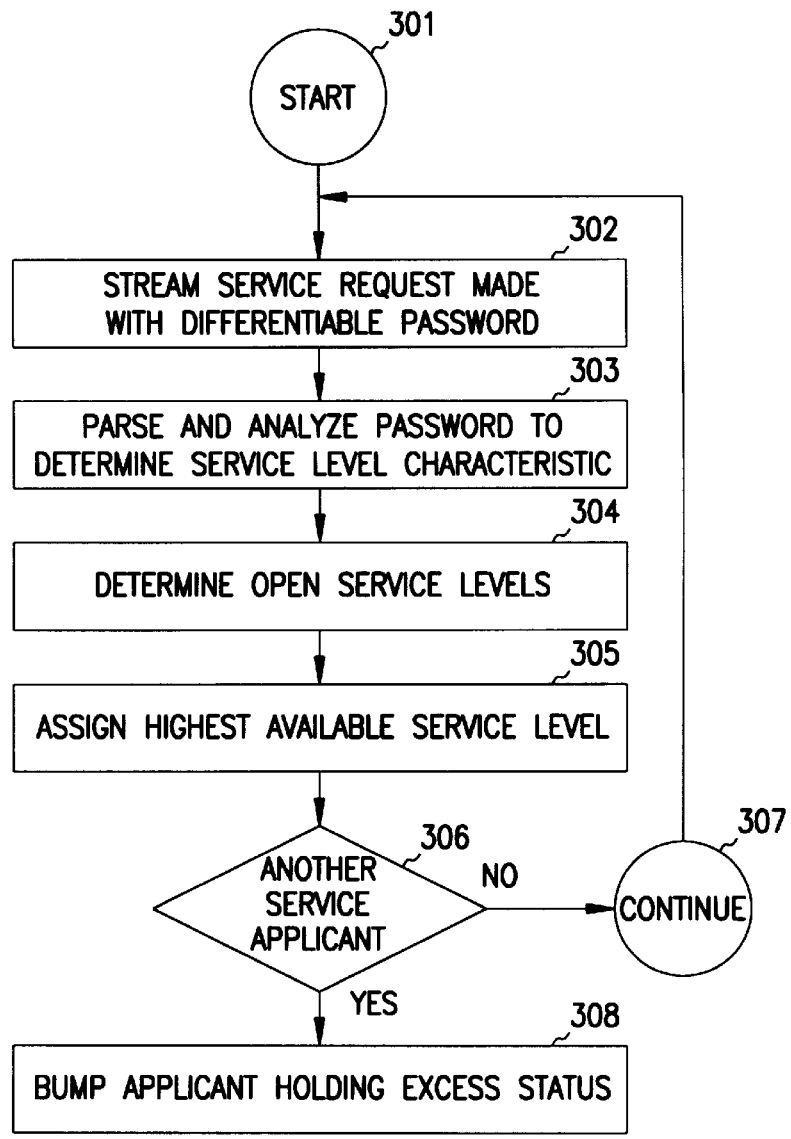
FIG. 1F is a flow chart of a password method 300 according to the present invention.

FIG. 1F is a flow chart of a password method 300 according to the present invention. In particular, the process starts 301 with a browser user making a stream service request with a multilevel password. According to the present invention, passwords having predetermined different service value levels are assigned to particular users. When a user makes a service request and provides a password to a media server able to provide stream services, the media server parses and analyzes 303 the password to determine its corresponding service level. The identified service level is the minimum service which is to be provided to a user carrying the particular password service level. A check is accordingly made, to determine the existence of particular service levels, i.e., which service levels are currently available 304. The user is according to the present invention assigned the highest available service level. Next, according to the present invention, another service applicant communicates 306 with a media server to obtain a pre-established service level which may be higher than the service level to which the user has applied. If there is no service applicant, the system continues 307 and the password processing continues according to the present invention. If there is another higher service level applicant and the lower service level user is bumped.

Figure 2:
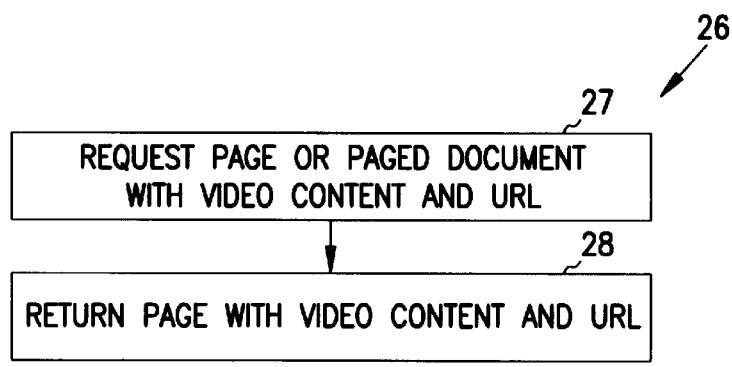
FIG. 2 is a flow chart of a method according to the present invention in which a user acting through a browser requests content, e.g., without limitation, a page or a paged document, including a media content link provided to the browser with a universal resource locator (URL) code associated with the provided content.

FIG. 2 is a flow chart of a method 26 according to the present invention in which a user acting through a browser requests particular content, e.g., without limitation, a page or a paged document linked with video content be provided to the browser, with a universal resource locator (URL) code being associated with the provided content. In particular, the method according to one embodiment of the present invention includes requesting 27 a page or paged document indicating desired video content as well as a content-associated URL. Further, the method includes returning 28 a requested page with a video a content link and an associated URL.

Figure 3A:
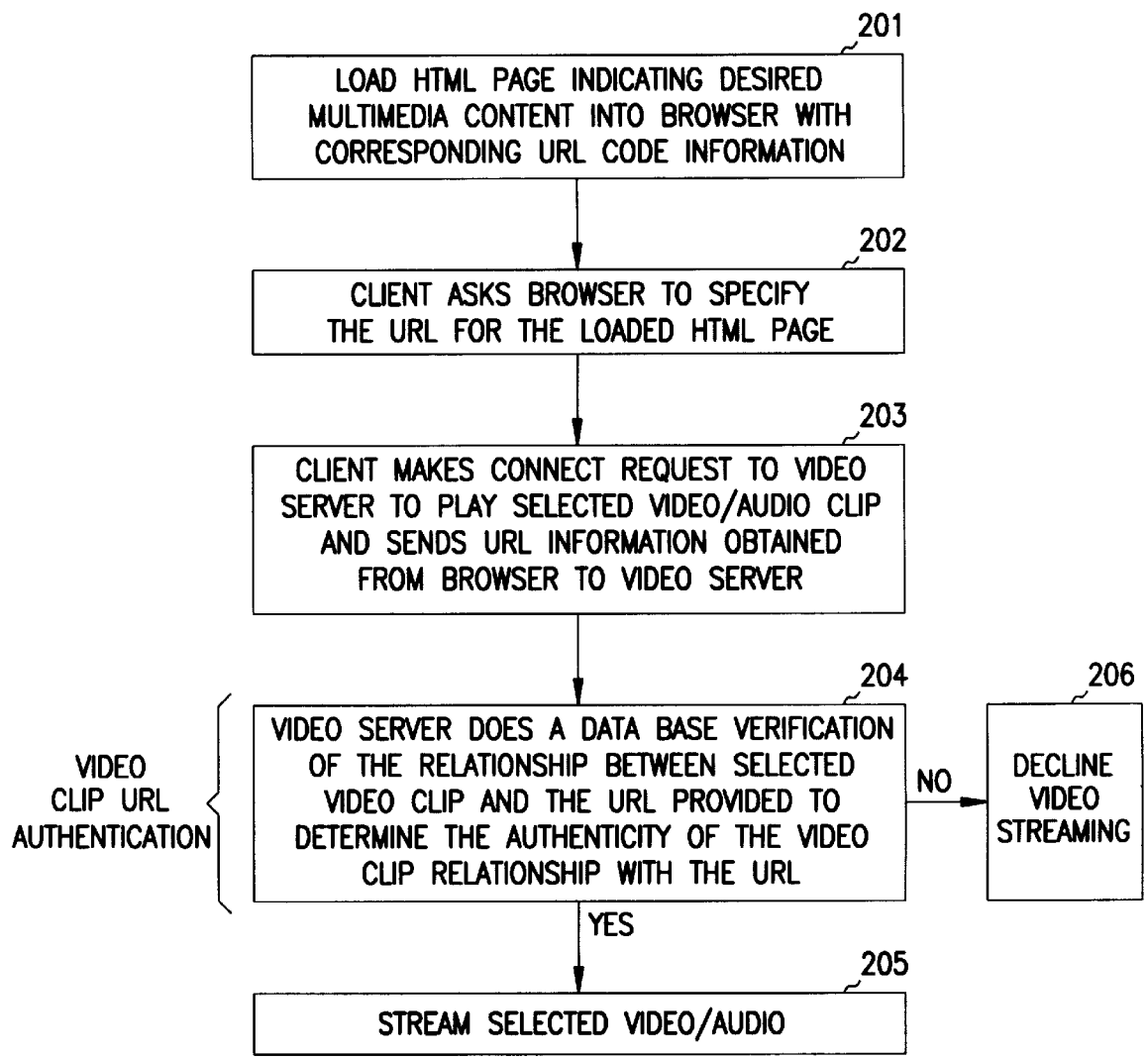
FIG. 3A is a flow chart of an authentication method according to one embodiment of the present invention, to determine whether the URL and the content provided for presentation represent an authorized combination.

FIG. 3A is a flow chart of an authentication method according to one embodiment of the present invention. The authentication method enables determination of whether the URL and the video or media work selected by the user for presentation represent an authorized combination. In particular, an HTML page indicating particular video or media work selected by the user is loaded 201 by a user into a selected browser. A plug-in client operable with the browser to present or perform the work is either pre-installed or is currently loaded or plugged into the browser. The plug-in 202 asks the browser, according to the present invention, to identify the URL specified on the HTML page displayed on the browser, to identify the media to be performed by streaming operation. The plug-in then makes a request 203 of a selected media server (e.g., according to the present invention video server) to play the desired media content (such as, for example, a selected video or audio clip or other content) and sends to the media server the URL it has received from the browser. The media server consequently does a data base verification 204 of the relationship between the selected video clip or other multimedia content and the provided URL to determine the authenticity of the video clip relationships with the URL. The data base verification according to one embodiment of the present invention includes searching the database for the name of the selected video or media work sought to be played or the path of the work and identifying the URL name with which the work or path is associated in the media server database. The media server database has preinstalled a table of authorized URL combinations of hosts, paths, and document names. According to one embodiment of the present invention, the media server data base, includes one or more passwords. When the URL of the HTML page containing the link to the streaming content has been authenticated as to path and file or at least as to file, an additional password authentication may be performed before streaming is permitted. If authentication is successful, the selected video, audio, or other multimedia content is streamed at a substantially real-time rate. If authentication is unsuccessful, the user is provided with the correct, authenticable URL, which permits the user to load a correct document (i.e., html page) with which to resubmit the streaming request. According to one embodiment of the present invention, the correct page is password protected. The user accordingly provides a password and a request page URL for authentication.

Figure 3B:
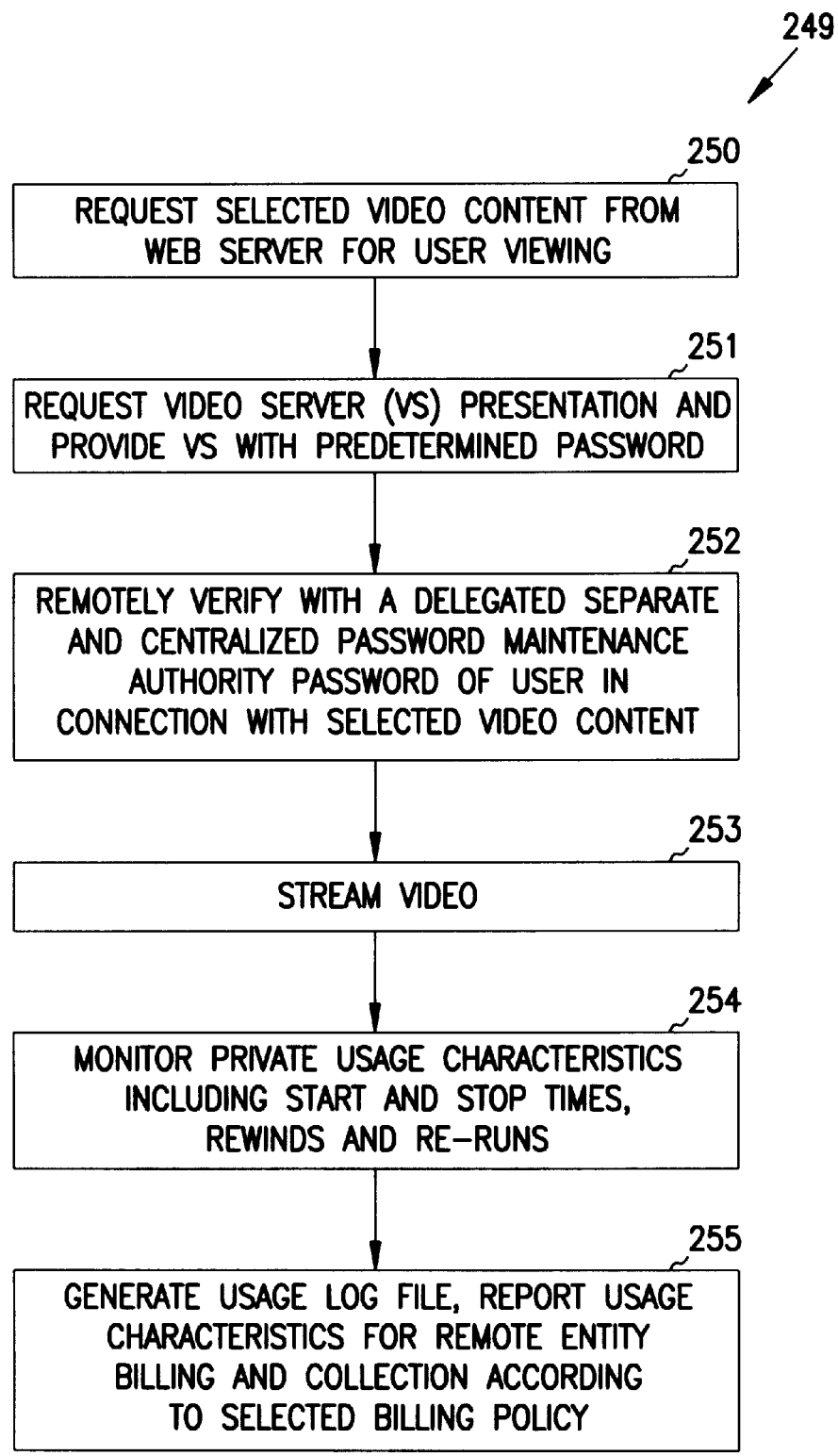
FIG. 3B is a flow chart of an authentication method according to one embodiment of the present invention.

FIG. 3B is a flow chart of an authentication method 249 according to one embodiment of the present invention. In particular, method 249 includes requesting 250 selected video or audio content from a particular web server to enable user viewing. The requested content is provided to a user (i.e., client) computer through the Internet, for example, to enable local playing and presentation of the desired content. To enable playing, a video or audio server is provided 251 with a request to stream the requested audio or video or combination thereof, and with a user password as well. Upon receipt of the stream request and the user password, the video/audio server undertakes to verify 252 the fact and degree of usage authorization of the user (based upon password) with respect to the identified content sought to be streamed and played. According to one embodiment of the present invention, the determination is made remotely with a predetermined authentication authority by communication with a remote designated or designable server addressed or connected through a selected network or other communications system or medium or combination thereof. In particular, password authorization can be accomplished by reference to a predetermined, centralized password maintenance authority. This is advantageous because only a single master password list or authority needs to be established and maintained, and the confusion of having multiple password lists is thereby eliminated. Once the password has been authorized in connection with selected content to be played, streaming of the content (e.g., video) is initiated 253. Further, according to the present invention, the user's private usage characteristics are monitored 254. Such usage characteristics may include recording start and stop times for video streaming, and recording rewind and rerun events. Finally, a log file or report is generated 255 based upon usage of streamed data, to enable billing to be accomplished as well as collection of amounts owing, in accordance with predetermined billing and collection policies. According to one embodiment of the present invention, billing and collection is undertaken by the content proprietor, licensee, or agent. According to another embodiment, billing is performed by the streaming authority according to an application program interface (API).

Figure 4:
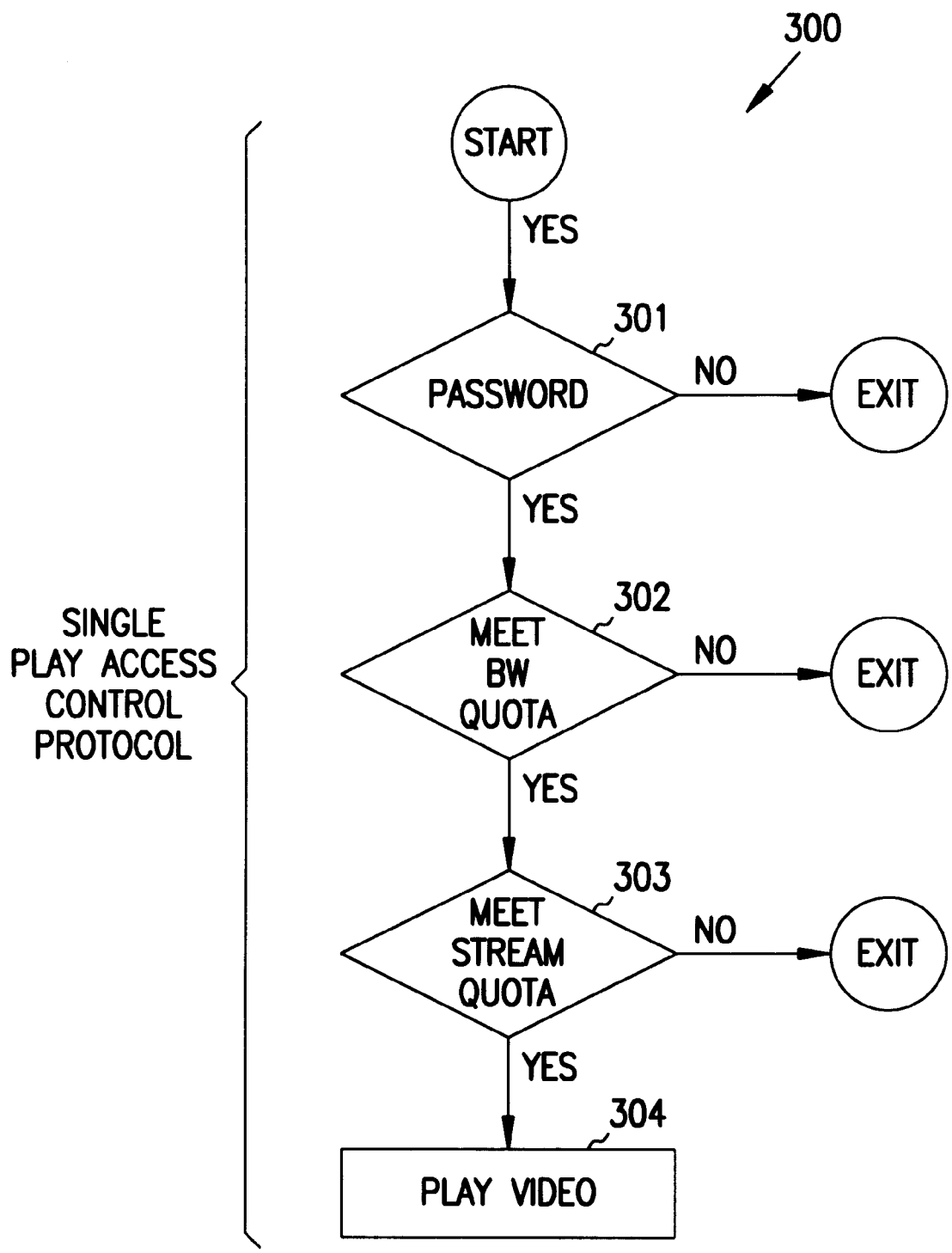
FIG. 4 is a flow chart of a user authentication protocol according to the present invention, which comprises a stream quota, a bandwidth quota, and a password authentication component.

FIG. 4 is a flow chart of a user authentication protocol 300 according to the present invention, which comprises a stream quota, a bandwidth quota, and a password authentication component. In particular, the user authentication protocol 300 includes checking 301 the validity of a password provided to a stream server by a client, either locally or remotely. If password authentication is successfully achieved with respect to selected content, then a check is made 302 to determine whether the requested performance or play action with respect to the selected content meets or exceeds the bandwidth (BW) policy of the stream server or the client user. The BW policy is a data rate quota established for a stream server or a client user. Additionally, a check is made 303 to determine whether the requested performance or play action with respect to the selected content meets or exceeds the stream quota of the stream server or the client user. The stream quota is a measure of the number of video or audio streams allotted to a particular stream server or client user. If the bandwidth, stream, and password requirements have been successfully traversed, streaming of the selected video or audio content is initiated and completed under user control or according to user requirements. If one of the indicated requirements is not met, streaming operation is barred or terminated. According to the present invention, the password authorization determination is made remotely of the content server in conjunction with or at a centralized password authority server.

According to the present invention, the bandwidth and stream quota determinations are made locally by the video server, as a form of self control of workload and job allocation determination. According to one embodiment, the password is encrypted and accordingly decrypted prior to evaluation.

Figure 5:
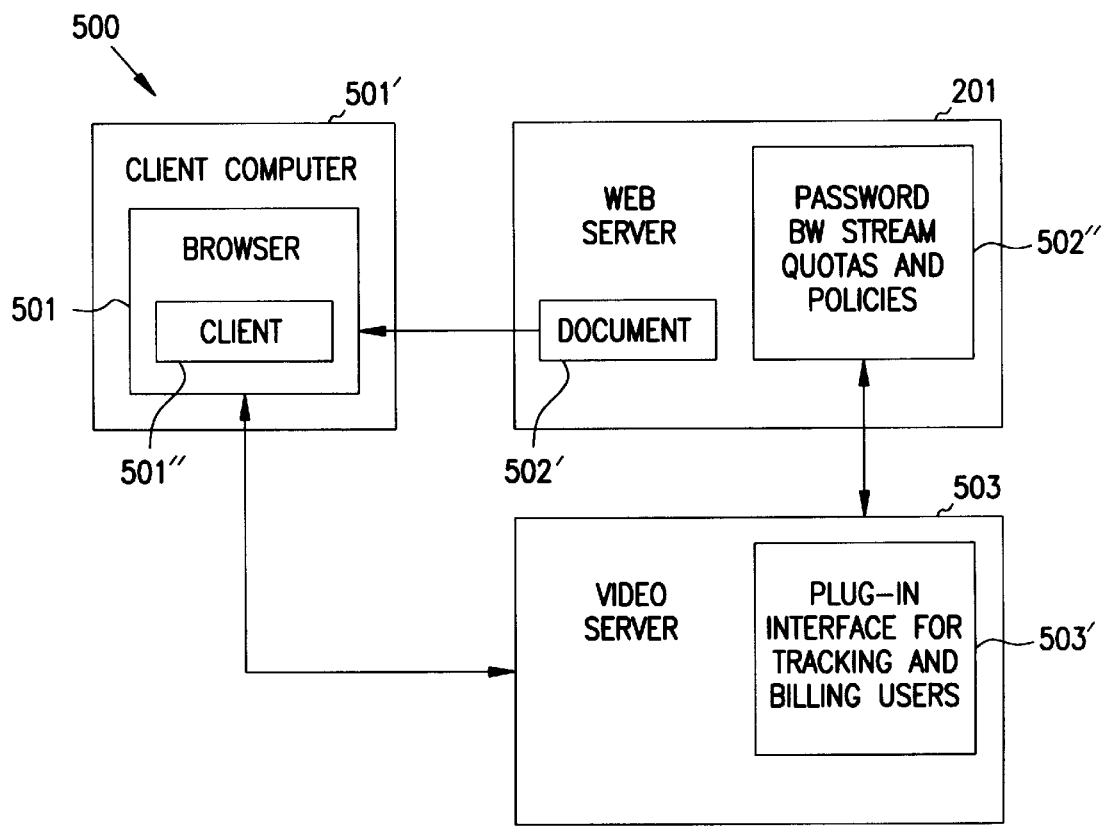
FIG. 5 is a block diagram of a computer system according to the present invention.

FIG. 5 is a block diagram of a computer system 500 according to the present invention. In particular, the computer system 500 includes a client computer 501 including a browser 501' in turn including a plug-in 501" which is plugged into the browser 501'. Computer system 500 further includes a web server 502 including a content data base 502' including documents, for example, and including a policy data base 502" containing at least one of (1) passwords relating to particular content or groups of content in content data base 502', (2) a bandwidth quota or policy for establishing a limit of data quantity over time (i.e., bits/second) permitted for a particular password, a particular user, and/or a particular video server, and (3) a stream quota or policy for establishing a limit of number of audio or video streams which are permitted for a particular password, a particular user, and/or a particular video server. Computer system 500 further includes a video server 503 including an interface 503' plugged in or integrated with video server 503, for enabling and facilitating communication with a selected server 502 to accomplish desired and predetermined authentication activities as well as, for example, user information tracking and billing services, which activities are performed, according to one embodiment of the present invention, by the web server 502 and, according to another embodiment by the video server in communication with the web server 502.

Figure 6:
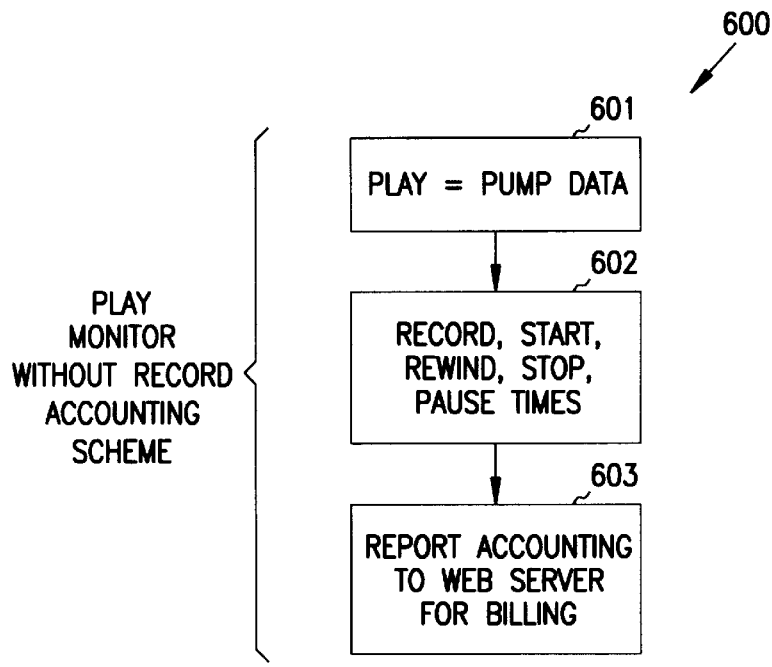
FIG. 6 is a flow chart of operation of a computer system according to one embodiment of the present invention.

FIG. 6 is a flow chart of operation of a computer system 600 according to one embodiment of the present invention. In particular, a video server plays, pumps or streams 601 data to a client computer which thereby receives a selected or requested work or clip for video or audio streaming performance. The computer system 600 according to the present invention monitors the video server streaming activity and records 602, for each user and each stream, the applicable activities performed or performable by a client computer, including any recording of performance activities, and each discrete start, stop, pause, rewind and play event or process. The recorded information or selected parts thereof are subsequently repeated 601 for accounting, pay per view processing by a separate server, which, according to one embodiment of the present invention.

Figure 7:
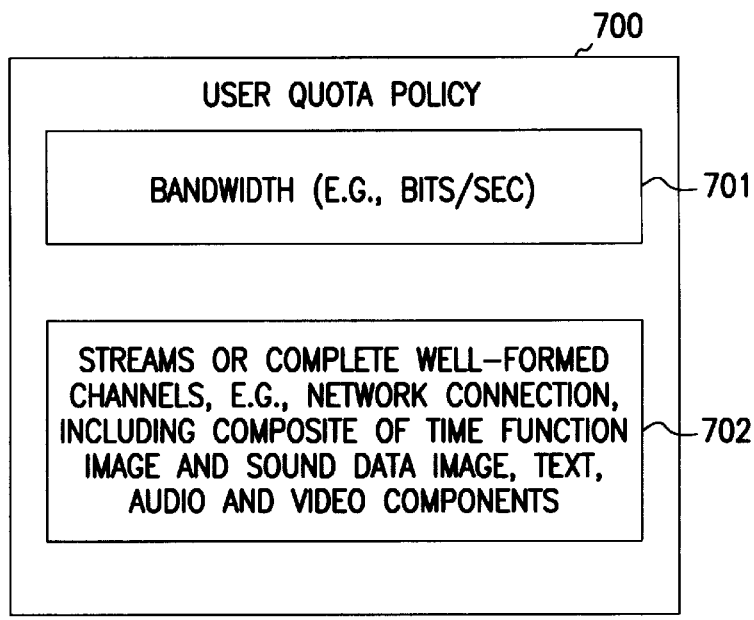
FIG. 7 is a block diagram of a user quota policy according to the present invention.

FIG. 7 is a block diagram of a user quota policy 700 according to the present invention. In particular, a user quota policy 700 includes at least one of first and second policies 701 and 702, respectively a user bandwidth policy 701 which may be expressed in terms of bits per second, and a stream policy 702 which is expressed in terms of allowed user streams or complete well-formed channels, e.g., network connections including, for example, a composite time function of image and sound data, text, audio and video components.

Figure 8:
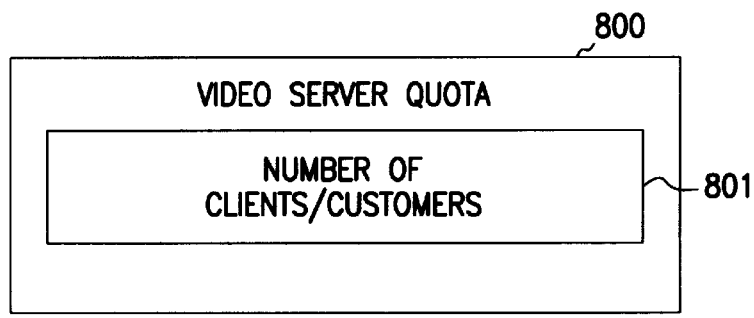
FIG. 8 is a block diagram of a video server quota policy according to the present invention, which includes a specified number of clients or customers.

FIG. 8 is a block diagram of a video server quota policy 800 according to the present invention, which includes a specified number of clients or customers 801. In particular, a video server unit is installed to serve a predetermined number of clients, as a result of information based upon the capacity of the video server.

Figure 9:
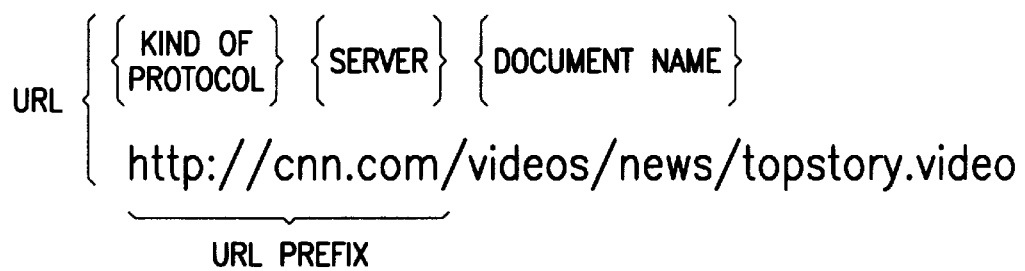
FIG. 9 is a diagram of the components of a uniform resource location (URL) designation which includes a URL prefix which establishes a particular kind of protocol and the server identified by the URL.

FIG. 9 is a diagram of the components of a uniform resource location (URL) designation which includes a URL prefix which establishes a particular kind of protocol and the server identified by the URL. The URL suffix which follows the URL prefix is a document name including a path to the particular document, e.g. video, which has been selected for viewing or presentation in a browser window, for example. According to one embodiment of the present invention, the URL prefix includes at least a portion of the file path of the file sought to be streamed. Accordingly, not only must the URL under authentication specify the authentic server, but the file to be streamed must fall within a predetermined authentic path or directory.

According to one embodiment, the present invention includes a computer program product comprising a computer storage medium and a computer program code mechanism embedded in the computer storage mechanism for enabling selected media streaming performances, the computer program code mechanism comprising a first computer code device configured to receive selected media content identification data (MCID) and a URL code identifying the source of the MCID; and a second computer code device configured to compare the MCID and the identifying URL code with an authorized MCID and URL combination to determine whether streaming is to be allowed.

What is claimed is:

1. An authentication method for streaming from a stream server to a client computer of a selected media content associated with information which has been loaded into a browser with a locator code identifying its source, comprising:

receiving an identification of the selected media content and the locator code identifying the source of the selected media content;

determining a bandwidth quota of the selected media content for the stream server and the client computer;

determining a stream quota of the selected media content for the stream server and the client computer;

authenticating that the bandwidth quota satisfies a bandwidth policy for the stream server and the client computer;

authenticating that the stream quota satisfies a stream policy for the stream server and the client computer; and authenticating that the identification of the selected media content and the identifying locator code are an authorized combination using a predetermined database.

2. The authentication method according to claim 1 wherein said identification of the selected media content and the identifying locator code are provided to a multimedia server for authentication.

3. The authentication method according to claim 1 wherein only a selected portion of the locator code is used for authentication.

4. The authentication method according to claim 1 wherein the selected portion of the locator code used for authentication comprises a prefix portion.

5. The authentication method according to claim 1 wherein the selected portion of the locator code used for authentication comprises a suffix portion.

6. The authentication method according to claim 1 wherein said database includes at least a single authorized locator code relating to said identification of the selected media content.

7. The authentication method according to claim 1 wherein said information includes HTML code.

8. The method according to claim 1 wherein the locator code comprises a Universal Resource Locator (URL) code.

9. An authentication system for verifying that particular media content being streamed from a server to a client is associated with a locator code identified with an owner of selected media content, comprising:

a receiver configured to receive the selected media content;

a quota mechanism for determining a bandwidth quota and a stream quota of the particular media content for the server and the client; and an authentication mechanism for authenticating that the identification of the selected media content and the identifying locator code are an authorized combination using a predetermined database and for authenticating that the bandwidth quota satisfies a bandwidth policy for the server and the client and for authenticating that the stream quota satisfies a stream policy for the server and the client.

10. An authentication method for ensuring that streaming is authorized for content selected for a media performance at a client machine which receives a page from a web server which identifies selected content for streaming from a particular media server, said authentication method comprising:

receiving a streaming request including an identification of the content selected for a media performance and an identification of the page which identifies the selected content;

comparing the identification of the content for a media performance with at least a portion of the identification of the page which identifies the selected content to determine whether streaming is to be permitted;

determining a bandwidth quota of the selected content for the particular media server and the client machine;

determining a stream quota of the selected content for the particular media server and the client machine;

authenticating that the bandwidth quota satisfies a bandwidth policy for the particular media server and the client machine;

authenticating that the stream quota satisfies a stream policy for the particular media server and the client machine; and authorizing streaming upon determining the comparison is successful and the bandwidth policy and the stream policy are satisfied.

11. The authentication method according to claim 10 wherein the identification of the page which identifies the selected content comprises a Universal Resource Locator (URL) code.

12. The authentication method according to claim 10 wherein said media server is a video server.

13. The authentication method according to claim 10 wherein the identification of the page which identifies the selected content comprises a path word and at least a single URL portion.

14. The authentication method according to claim 13 wherein the page comprises a password protected page.

15. A computer-readable medium having computer-instructions for causing a computer to perform a method for authenticating streaming from a stream server to a client computer of a selected media content, the method comprising:

receiving an identification of the selected media content and a locator code identifying a source of the selected media content;

determining a bandwidth quota of the selected media content for the stream server and the client computer;

determining a stream quota of the selected media content for the stream server and the client computer;

authenticating that the bandwidth quota satisfies a bandwidth policy for the stream server and the client computer;

authenticating that the stream quota satisfies a stream policy for the stream server and the client computer; and authenticating that the identification of the selected media content and the identifying locator code are an authorized combination using a predetermined database.

16. A computer-readable medium having computer-instructions for causing a computer to perform a method for ensuring that streaming is authorized for content selected for a media performance at a client machine which receives a page from a web server which identifies selected content for streaming from a particular media server, the method comprising:

receiving a streaming request including an identification of the selected content and an identification of a page which identifies the selected content;

comparing the identification of the selected content with at least a portion of the identification of the page which identifies the selected content to determine whether streaming is to be permitted;

determining a bandwidth quota of the selected content for the web server and the client machine;

determining a stream quota of the selected content for the web server and the client machine;

authenticating that the bandwidth quota satisfies a bandwidth policy for the web server and the client machine;

authenticating that the stream quota satisfies a stream policy for the web server and the client machine; and authorizing streaming upon determining the comparison is successful and the bandwidth policy and the stream policy are satisfied.

* * * * *